United States Patent
Fanson et al.

(10) Patent No.: US 7,327,794 B2
(45) Date of Patent: Feb. 5, 2008

(54) METHOD AND APPARATUS FOR DETECTING A JAMMED CHANNEL IN A BLOCK ORIENTED DIGITAL COMMUNICATION SYSTEM

(75) Inventors: John Louis Fanson, Ottawa (CA); Douglas Hamilton Taylor, Kanata (CA); Bradley Robert Lynch, Ottawa (CA)

(73) Assignee: Intellon Corporation, Ocala, FL (US)

( * ) Notice: Subject to any disclaimer, the term of this patent is extended or adjusted under 35 U.S.C. 154(b) by 949 days.

(21) Appl. No.: 10/177,663

(22) Filed: Jun. 24, 2002

(65) Prior Publication Data
US 2003/0235254 A1   Dec. 25, 2003

(51) Int. Cl.
*H04K 1/10* (2006.01)
*H04L 27/28* (2006.01)

(52) U.S. Cl. .................. 375/260; 375/296; 375/346

(58) Field of Classification Search ................ 375/260, 375/222, 346, 371, 296, 297, 267; 370/210, 370/208; 455/501, 306, 296, 63, 1; 342/16, 342/17, 203, 13, 19, 165, 166
See application file for complete search history.

(56) References Cited
U.S. PATENT DOCUMENTS

| | | | |
|---|---|---|---|
| 3,938,149 A * | 2/1976 | Grantham ................ 342/94 |
| 4,544,926 A * | 10/1985 | Giuli ...................... 342/19 |
| 4,768,219 A * | 8/1988 | Yamagata et al. ......... 455/464 |
| 5,930,231 A * | 7/1999 | Miller et al. ............ 370/210 |
| 6,088,327 A | 7/2000 | Muschallik et al. ....... 370/210 |
| 6,111,919 A * | 8/2000 | Yonge, III ............... 375/260 |
| 6,240,129 B1 | 5/2001 | Reusens et al. ........... 375/222 |
| 6,269,132 B1 | 7/2001 | Yonge, III ............... 375/346 |
| 6,438,367 B1 * | 8/2002 | Crawford ................ 455/410 |
| 6,724,840 B1 * | 4/2004 | Osofsky et al. .......... 375/346 |
| 6,751,187 B2 * | 6/2004 | Walton et al. ........... 370/210 |
| 7,110,434 B2 * | 9/2006 | Currivan et al. ......... 375/144 |
| 2002/0122499 A1 * | 9/2002 | Kannan et al. ........... 375/260 |
| 2002/0127986 A1 * | 9/2002 | White et al. ............ 455/194.2 |
| 2003/0086366 A1 * | 5/2003 | Branlund et al. ......... 370/208 |
| 2003/0185282 A1 * | 10/2003 | Hudson .................... 375/146 |
| 2003/0216122 A1 * | 11/2003 | Cordone et al. .......... 455/63.1 |

\* cited by examiner

*Primary Examiner*—Chieh M. Fan
*Assistant Examiner*—Qutub Ghulamali
(74) *Attorney, Agent, or Firm*—Fish & Richardson P.C.

(57) ABSTRACT

A method and apparatus for detecting a channel jammed by narrowband jamming interference in a block oriented digital transmission system such as an orthogonal frequency division multiplexing (OFDM) or discrete multi-tone (DMT) system. A spectrum of a received data bearing signal is examined to identify areas of the spectrum that are likely corrupted by a narrowband jamming interference. The method identifies jammed channels by applying a boxcar filter, in order to identify narrow peaks in the spectrum that are substantially larger in magnitude than adjacent channels. Channels identified as jammed or affected by a jamming signal, are listed in a jam mask used for screening out corrupted channels during data transmission.

33 Claims, 6 Drawing Sheets

METHOD AND APPARATUS FOR DETECTING A JAMMED CHANNEL IN A BLOCK ORIENTED DIGITAL COMMUNICATION SYSTEM

CROSS-REFERENCE TO RELATED APPLICATIONS

This is the first application filed for the present invention.

TECHNICAL FIELD

The present invention relates to broadband data transmission and more particularly to a method for detecting a jammed channel in a block oriented transmission system.

BACKGROUND OF THE INVENTION

Data transmission using a block oriented digital transmission system such as orthogonal frequency division multiplexing (OFDM) or discrete multi-tone (DMT) signaling involves dividing a predetermined bandwidth into several narrowband channels, each channel having its own frequency of transmission. The data transmission in each narrowband channel can be affected by interference from external noise sources. OFDM and DMT are used in home networks were data is transmitted on pre-existing alternating current (AC) power lines. A power line is a noisy transmission medium for data communication. Noise sources, such as electronic and electro-mechanical sources that are generated by brush electric motors in home appliances, dimmer switches, fluorescent and halogen lights, etc., create impulse noise related to a 50 or 60 Hz power cycle. In addition, power supplies create harmonics associated with their switching frequency. Also, external transmissions, such as impulse noises and radio frequency (RF) interference from such sources as short wave and amateur radio, and other bands, can affect the quality of the channel on the power line. These noise sources interfere with reception of data signals, usually resulting in signal corruption, resulting in data errors, especially if the power of the external interfering signal is higher than the power of the transmitted OFDM signal. Information about channels affected by RF interference or other jammer signals is useful, and can be used to discard data sent on jammed channels. Several methods for detecting jammed channels using the analysis of signals received by a receiver are known in the prior art. A window function is one of the simplest means for analyzing the received signal.

For example, U.S. Pat. No. 6,111,919 issued to Yonge, III, on Aug. 29, 2000, titled "SYNCHRONIZATION OF OFDM SIGNALS" discloses a method for temporarily aligning a received symbol that is transmitted via OFDM channels, with a reference symbol and/or an earlier received symbol. According to Yonge, received information is processed by applying a window function, such as Hanning, a Hamming or a Blackman window. The window function is applied for filtering the signal prior to applying a fast Fourier transform (FFT) to the received signal. However, Yonge, does not use the window filter for identifying jammed channels, nor does he teach maintaining a list of jammed channels during OFDM data transmission.

Therefore, there exists a need for a simple method and apparatus that is adapted to identify jammed channels in an OFDM or DMT data transmission system, where an interference can corrupt the data transmission.

SUMMARY OF THE INVENTION

It is an object of the present invention to provide an apparatus and a method for detecting a jammed channel in a block oriented digital communication system.

There is therefore provided, in accordance with an aspect of the invention, an apparatus for detecting a narrowband jamming signal in a block oriented digital transmission system, including a filtering unit connectable to a channel selector, adapted to receive a set of data from the channel selector for identifying a channel that is jammed by a jamming signal having a signal power that exceeds a predetermined threshold with respect to an average power of selected adjacent channels, a masked channel selector connected to the filtering unit adapted to receive an indication of the jammed channel from the filtering unit and to identify the jammed channel and a predetermined number of adjacent channels affected by the jamming signal, and a jam mask memory connected to the masked channel selector for storing information that identifies the jammed channel and adjacent channels.

In accordance with another aspect of the invention there is provided a method for detecting narrowband jamming signals in a block oriented digital transmission system, including steps of filtering a set of data from a selected channel received from a channel selector for identifying a jammed channel that transmits a signal having a signal power that exceeds a predetermined threshold with respect to an average power of selected adjacent channels using at least one rectangular window filter, identifying a jammed channel and a predefined number of adjacent channels, and storing data for identifying the jammed channel and the adjacent channels in a jam mask memory.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Orthogonal frequency division multiplexing (OFDM) and discrete multi-tone (DMT) are block oriented digital communication systems where a block of complex information bearing symbols (an information block) is encoded onto a transmitted waveform that comprises a summation of sinusoidal signals. This waveform (referred to herein as a physical layer (PHY) symbol) lasts for a predetermined period of time. Subsequent information blocks are transmitted in subsequent PHY symbols. The component sinusoidal signals are often referred to as sub-carriers or tones. Before data can be transmitted between two network elements or channels, as is well known in the art, a sender network element transmits a channel estimate request in a highly robust mode, such as ROBO (ROBust OFDM) mode, and a media access control (MAC) address to a receiver element. Upon receipt of a channel estimate request, the receiver element analyses the received request, identifies a quality of data transmission in each channel, identifies channels that are subject to interference, and transmits back to the sender element a tone or channel map that provides a list of channels that can or cannot be used for data transmission.

In order to analyze a received signal the information bearing symbols are extracted from the signal by performing a discrete Fourier transformation (DFT) on the sampled PHY symbols and then performing an equalization which includes dividing each DFT output by a complex channel estimate.

Figure 1:
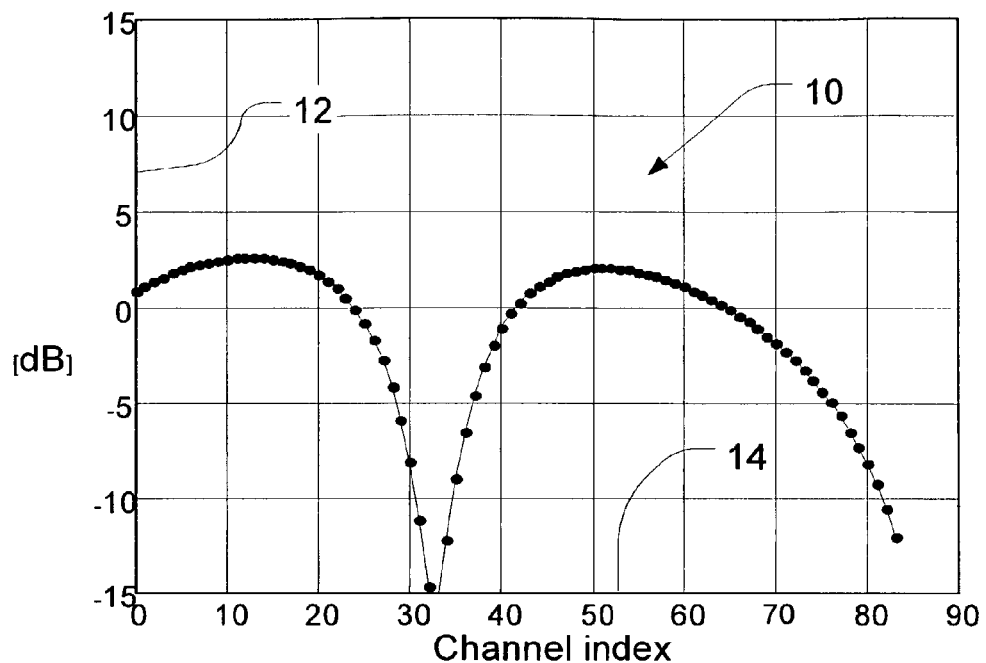
FIG. 1 is a graph of output power of a discrete Fourier transform (DFT) of a received discrete multi-tone (DMT) signal.

FIG. 1 is a graph 10 of a DFT of an exemplary received DMT signal wherein a vertical axis 12 represents power and a horizontal axis 14 represents a channel index. A spectrum of the received DMT signal includes 84 unjammed channels.

Figure 2:
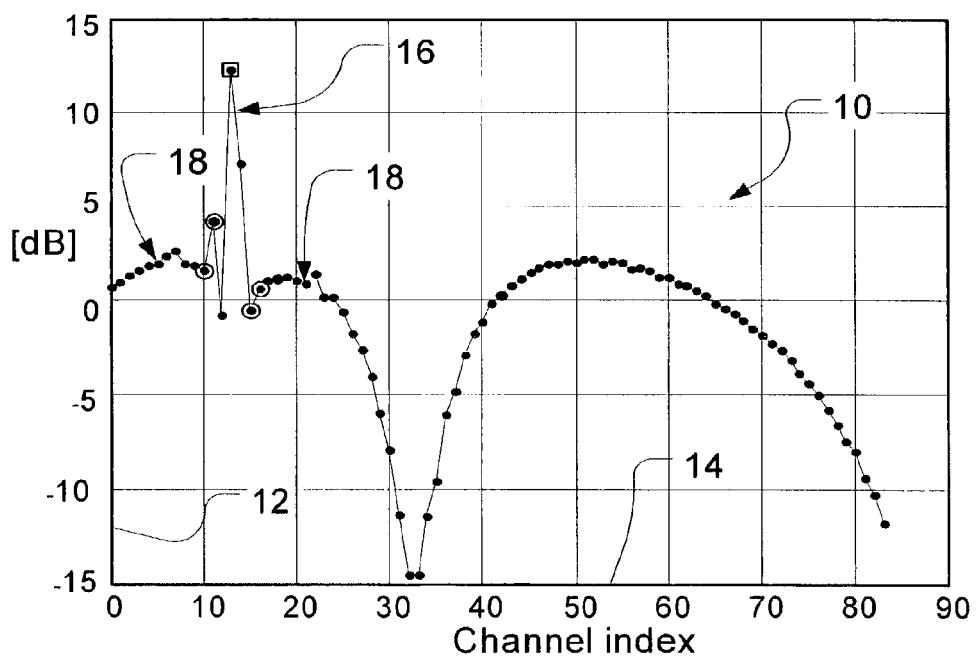
FIG. 2 is a graph of output power of a DFT of a received DMT signal affected by a jamming signal.

FIG. 2 is a graph of a DFT of the same DMT signal shown in FIG. 1 except that a jamming signal that has been added as indicated by a narrow peak 16. A power of the jamming signal 16 is substantially larger than neighboring channels 18 and thus the jamming signal 16 can be identified by comparing a power of the received signal at each channel with a function of a power of a plurality of neighboring channels. In order to detect a channel jammed by a narrowband jamming signal, the invention applies a boxcar filter that slides a window across a tone power spectrum, on a per channel basis. A power of the received signal in each channel is compared to an average of powers of adjacent channels. If a ratio of a power of a channel to an average power of adjacent channels exceeds a predefined threshold factor, then a jammed channel is deemed to have been detected.

Figure 3:
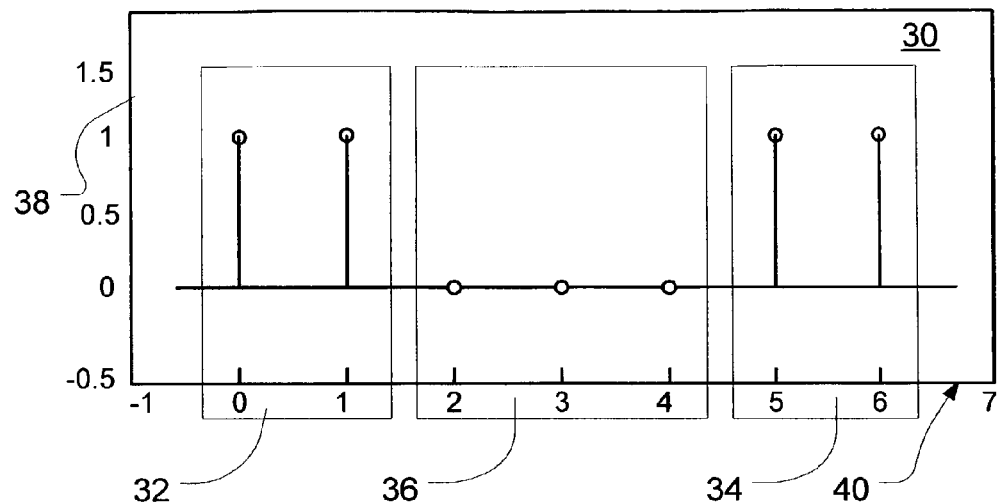
FIG. 3 is a graph of a 2-3-2 boxcar filter.

FIG. 3 is graphical representation of an exemplary $n_1-n_2-n_3$ boxcar filter 30 having two rectangular windows 32 and 34 that are $n_1=n_3=2$ samples wide that are separated by a window 36 that is $n_2=3$ samples wide. The boxcar filter is characterized by integers $n_1$, $n_2$ and $n_3$ that define characteristics of the averaging window used to obtain a reference value. The boxcar filter represented in FIG. 3 is known in the art as a 2-3-2 boxcar filter. The vertical axis 38 of the graph represents a coefficient that can be applied to a power value of each sample (horizontal axis 40) that is used in a calculation. A coefficient of "1" in the window filter 30 is used for samples 0, 1, 5 and 6 and "0" for samples 2, 3 and 4 to compute a reference value. The reference value, which is an arithmetic average, is computed by adding a power of each channel in the first window 32 (e.g. the samples 0 and 1) and a power of each channel in the third window 34 (e.g. the samples 5 and 6), and then dividing by $n_1+n_3$. This reference is compared with a power of the center channel, e.g. the sampled channel 3.

Figure 4:
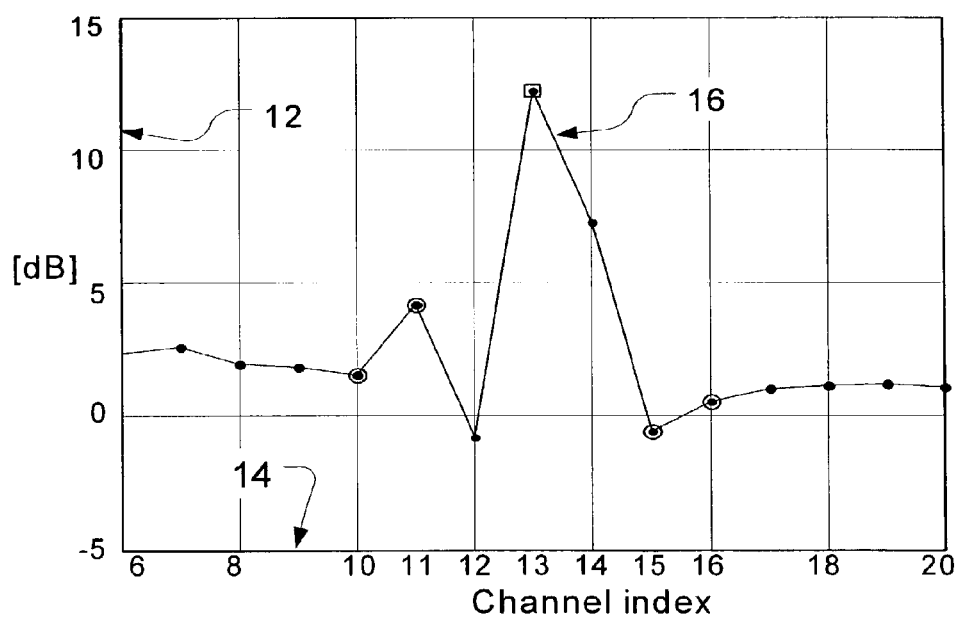
FIG. 4 is a graph showing an expanded view of the DFT of the received DMT signal of FIG. 2 in a vicinity of the jamming signal.

FIG. 4 is a graph showing an expanded view of the DFT of the received DMT signal shown in FIG. 2 in a vicinity of the jamming signal 16. The channels "10", "11", "15" and "16" are isolated by a 2-3-2 boxcar window that is centered at channel "13". The reference value obtained from this position of the window is 1.5 (1.8 dB). A power of the channel "13" is 16.7 (12.2 dB) (note that relative powers are plotted in FIG. 4 as dB, but referenced here as linear values). In this example, a threshold factor is set to 8 (9 dB) and therefore a jamming signal is detected at channel "13" since 16.7 is greater than 1.5×8=12 (10.8 dB). The filter did not identify a jamming signal at any other location in the spectrum.

Channels that are identified as being jammed are included in a jam mask, which is a list identifying channels that are affected by jamming signals. The example depicted in FIGS. 2 and 4 illustrates that the jamming signal affects more than channel "13". It can be seen in FIGS. 2 and 4 that there is a significant effect on channel "14" and smaller effects on several other channels. A failure to detect jammed channels can be explained by "leakage" and poor frequency selectivity of a DFT filter used in DMT demodulation. Therefore, when the jam mask is prepared, a predetermined number of channels on either side of any identified jammed channel are also included in the jam mask.

The jam mask can be used in subsequent processing operations to mitigate the effects of the jamming signal. For example, it is well known that forward error correction (FEC) schemes provide error correction particularly when it is known beforehand which bits are likely to be in error. Such schemes include, for example, erasure or soft decision decoding methods. Any data encoded on channels that are listed in the jam mask are likely to have errors after decoding and can be input to a FEC decoder as an erasure or low reliability input, to improve the error correction performance. As another example, symbol synchronization for OFDM or DMT systems is often performed by processing the DFT outputs to a predetermined transmit signal. However, the presence of a large narrowband jammer can cause this process to fail. If channels affected by the jammer are identified and simply deleted from the processing, the synchronization will be successful.

The procedure for detecting jammed channels discussed above is effective for all channels of the spectrum except the edges of the DFT output power spectrum. In the example illustrated above, the 2-3-2 boxcar can not be applied to detect a jamming signal on the first three or last three channels of the spectrum (channels: 0, 1, 2, 81, 82, and 83) because the averaging window used to obtain the reference value extends past the ends of the spectrum. The boxcar filter calculation near the edges of the spectrum is adapted to pad a sufficient number of channels having zero power on both sides of the spectrum. In order to obtain the reference value, either $n_1$ or $n_2$ rather than $n_1+n_2$ is used as a divider.

A size of a jamming signal that will be detected is determined by a frequency selectivity of the DFT, the threshold factor, $n_1$, $n_2$, and $n_3$ The frequency response of a rectangular window of duration N is $$X(\omega) = \sum_{n=0}^{N-1} e^{-j\omega n} = e^{-j\frac{\omega}{2}(N-1)} \frac{\sin(\omega N/2)}{\sin(\omega/2)} \quad (1)$$

where $j=\sqrt{-1}$, and e is a natural logarithm base.

The response of an N-point DFT to a sinusoidal signal $\cos(\omega_0 n+\theta)$ can be computed to be:

$$Y(k) = \frac{1}{2}\left[e^{j\theta}X\left(\frac{2\pi k}{N}-\omega_0\right)+e^{-j\theta}X\left(\frac{2\pi k}{N}+\omega_0\right)\right] \quad k=0:N-1 \quad (2)$$

Figure 5:
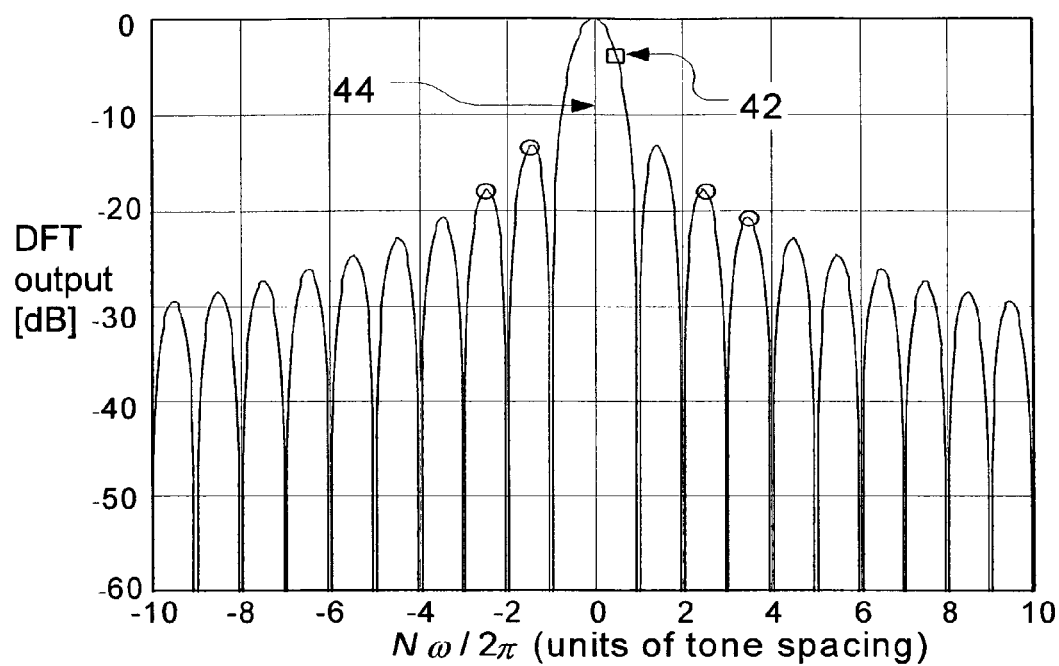
FIG. 5 is a graph of a frequency response indicating a frequency selectivity of DFT processing of a sinusoidal jamming signal.

Consequently the rectangular window frequency response is a good indication of the frequency selectivity of DFT processing of a sinusoidal jamming signal. This frequency response in the vicinity of the main lobe is shown in FIG. 5. The points of the frequency response that would be processed by a 2-3-2 boxcar when a jamming signal 44 is centered at a half of a channel's frequency width below a channel 42. In this example, the threshold factor is about ⅟₁₀ (10 dB below) the center channel power. Consequently, the threshold factor is less than 10 (10 dB) (in the example above it was 8 (9 dB)). In this case, if the power of the jamming signal is about 10 times (10 dB) the signal power, 4 channels centered on the jamming signal are included in the jam mask. This includes all channels substantially affected by the jamming signal. If the power of the jamming signal is greater, the boxcar is able to detect it, but including only 5 channels in the jam mask may not be enough. The boxcar filter described above is adapted to detect narrow peaks in the spectrum. However, because of the poor frequency selectivity of DFT processing, large jamming signals will not show up as narrow peaks and, as a result, larger spectrum jammer signals may lead to higher error rates.

Figure 6:
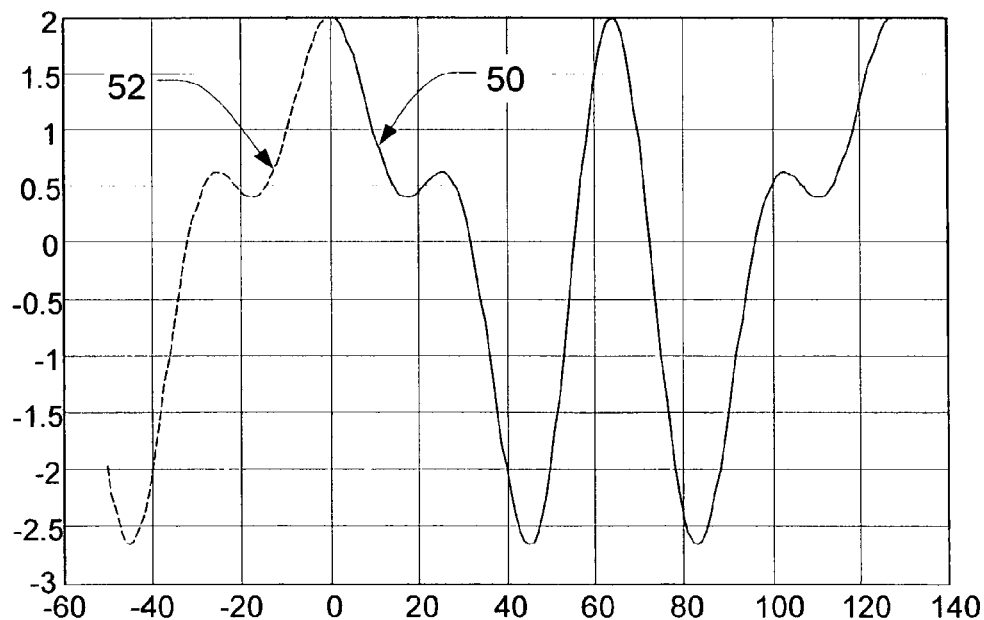
FIG. 6 is a graph of a PHY symbol having a prefix.

The frequency selectivity of the DFT output can be improved dramatically using a technique that takes advantage of a fact that DMT and OFDM systems are adapted to use a cyclic prefix. A cyclic prefix, as shown in FIG. 6, is a periodic extension of the PHY symbol 50 whereby $n_g$ samples from the end of the symbol are copied and prefixed to the symbol to create an $n_g+N$ sample long PHY symbol, the cyclic prefix is illustrated using a dashed line 52. This enables the possibility of forming a weighted average of the duplicated samples prior to performing the DFT. The weights are selected in such a way that the samples from the desired signal will be unaffected by the process but any undesired signal is likely to sum out of phase and thus be partially cancelled by the process.

Let a single received PHY symbol (r(n)) be indexed by the integers from $-n_g$ to N-1 where the samples that are indexed by negative integers represent the cyclic prefix.

$$u(n) = \begin{cases} r(n) & n=0:N-n_g-1 \\ w(n)r(n)+(1-w(n))r(n-N) & n=N-n_g:N-1 \end{cases} \quad (3)$$

where w(n) is any function of n into real values between 0 and 1. The pre-summed series (u(n)) is then used as the input to an N point DFT.

If we define a window function as $$x(n) = \begin{cases} 1-w(n+N) & n=-n_g:-1 \\ 1 & n=0:N-n_g-1 \\ w(n) & n=N-n_g:N-1 \end{cases} \quad (4)$$

and compute the frequency response of this function:

$$X(\omega) = \sum_{n=-n_g}^{N-1} x(n)e^{-j\omega n} \quad (5)$$

then the DFT output is as defined in equation (2) so the frequency response of the window function controls the frequency selectivity of the DFT with cyclic pre-summing. One choice for w(n) is a raised cosine:

$$w(n) = \frac{1}{2}\left[1+\cos\left(\frac{\pi}{n_g}(n-N+n_g)\right)\right] \quad (6)$$

Figure 7:
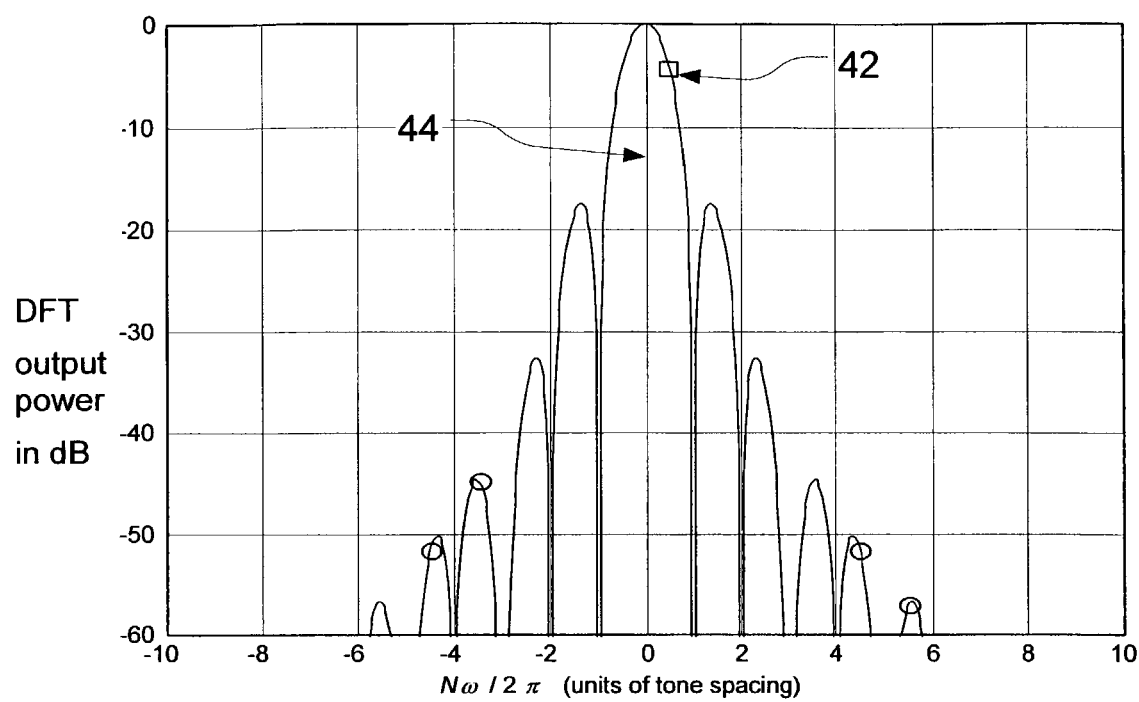
FIG. 7 is a graph showing a frequency selectivity of DFT processing of a sinusoidal jamming signal using pre-summing of a cyclic prefix.

The frequency response corresponding to this option with $n_g=N/2$ is plotted in FIG. 7. The frequency selectivity shown in FIG. 7 is a significant improvement over the DFT processing without the use of the pre-summed series as shown in FIG. 5. The points in a 2-7-2 boxcar processing of a jamming signal centered a half channel's frequency 42 below the boxcar center 44 are highlighted. A threshold factor is set around 10,000 (40 dB) and could be used to detect a jamming signal having a power 10,000 times (40 dB) greater than the adjacent channels. Seven channels adjacent to the center channel could then be added to the jam mask.

The 2-7-2 boxcar described above could be used in conjunction with a much smaller threshold factor to detect smaller jamming signals. However, this would have two undesirable effects. For smaller jamming signals it is not necessary to place seven channels in the channel jam mask. Also, there is a risk that a peak in the received spectrum could be narrow enough to be mistaken for a jamming signal if the threshold factor was set too low. For optimum detection of jammed channels the spectrum should be processed with several boxcar filters in conjunction with threshold factors that are based on the computed DFT output.

Although the invention has been discussed in the context of DMT and OFDM communication systems, it could be used to identify channels jammed by narrowband signals of any signal that includes multiple, discrete, carriers.

Although the invention has also been described using a DFT as a means for measuring a signal spectrum, the invention is also applicable to systems in which transmitted spectra are computed by other means.

The processing described above has dealt with a power of DFT outputs. However, an equivalent processing could be done with any other monotonic function of the power such as a logarithm or a square root of the power of DFT outputs.

Figure 8:
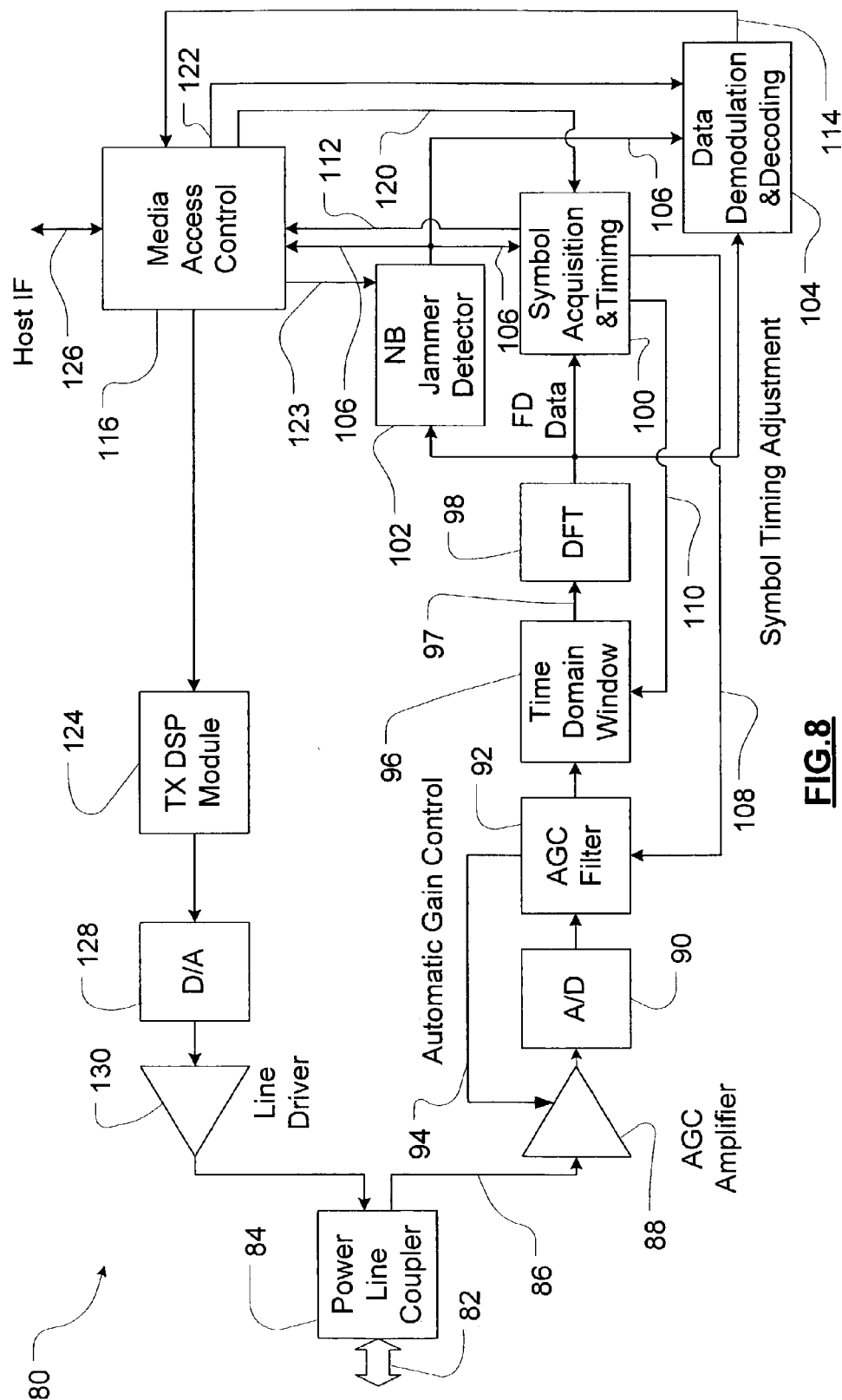
FIG. 8 is a block diagram of an embodiment of an OFDM or DMT power line modem in accordance with the invention.

FIG. 8 illustrates a preferred embodiment of a power line modem 80 adapted to provide data communication over a power line using OFDM or DMT while dynamically identifying jammed channels. OFDM and DMT use a block oriented digital data transmission, the blocks comprising complex information bearing symbols (an information block) that are encoded onto a transmit waveform that includes a summation of sinusoidal signals. This waveform lasts for a predetermined length of time and is referred to as a PHY symbol. Subsequent information blocks are transmitted as subsequent PHY symbols. Each PHY symbol includes a cyclic prefix and an OFDM symbol, wherein a cyclic prefix is used as a synchronization symbol that is removed and only an OFDM symbol is used as the information block. The modem 80 receives an analog signal 82 using a power line coupler 84 that is adapted to receive signals from another modem (not shown) that is connected to the same power line. The power line coupler 84 outputs an analog signal 86 to an automatic gain control (AGC) amplifier 88. The output signal from the amplifier 88 is fed to an analog-to-digital (A/D) converter 90. A digital output signal from the A/D 90 is fed to an AGC filter 92 that controls the AGC amplifier 88 via a loopback connection 94. After AGC filter 92, the signal is fed to a time domain window 96 that is adapted to delete a cyclic prefix from the received signal and to send the OFDM symbol 97 to a discrete Fourier transformation (DFT) unit 98.

The DFT unit 98 performs a calculation by converting a sampled waveform into a sequence of complex numbers that characterizes a spectrum of the sampled waveform. The output data of DFT unit 98 is fed at the same time to a symbol acquisition and timing circuit 100, a narrowband jamming signal detector 102 and a data demodulation and decoder module 104. The narrowband jamming signal detector 102 is designed to detect and maintain a list of jammed channels. The narrowband jamming signal detector 102 provides the information about a jammed channel 106 to symbol acquisition and timing circuit 100 and to the data demodulation and decoder module 104. The jammed channel list is used by another power network modem (not shown). The symbol acquisition and timing circuit 100 is adapted to analyze data received from the DFT unit 98 using information about the jammed channels to control the AGC filter 92 and the time domain window 96. After receiving a preamble, the symbol acquisition and timing circuit 100 sends an instruction using a connection 108 to the AGC filter 92 to freeze AGC gain of the AGC amplifier 88 to keep the AGC amplifier 90 from overcompensating during PHY symbol acquisition. At the same time, the symbol acquisition and timing circuit 100 sends, over a connection 110, an instruction that includes a value requesting a time delay, to the time domain window 96 for proper window alignment. The narrowband jamming signal detector 102, the symbol acquisition and timing circuit 100 and the data demodulation and decoder module 104 are coupled via respective connections 106, 112 and 114 to a media access controller 116 having a media access control (MAC) address that serves as a unique physical network address, for communicating with a host (not shown), to manage received and transmitted streams of data and to control the symbol acquisition and timing circuit 100 via connection 120 and the data demodulation and decoder module 104 via a connection 122. On receipt of a channel estimation response via the connection 114 from the data demodulation and decoding circuit 104, the media access controller 116 stores a tone map indicating which tones should be used for future transmissions to the responding station.

The media access controller 116, on receipt of a set of data from the data demodulation and decoder module 104 via connection 114, responds with an instruction via connection 122 respecting what to do with the received data, such as discard received data or continue data reception. In addition, the media access controller 116 controls the narrowband jamming signal detector 102 via connection 123. The media access controller 116 is also coupled to a transceiver digital signal processing (TX DSP) module 124 that is adapted to process data received via connection 126 from the host, using the MAC 116. The TX DSP module 124 processes the data and sends it to a digital-to-analog (D/A) converter 128. The output signal from the D/A converter 128 is fed to a line driver 130 which sends a signal via the power line network using a power line coupler 84.

Figure 9:
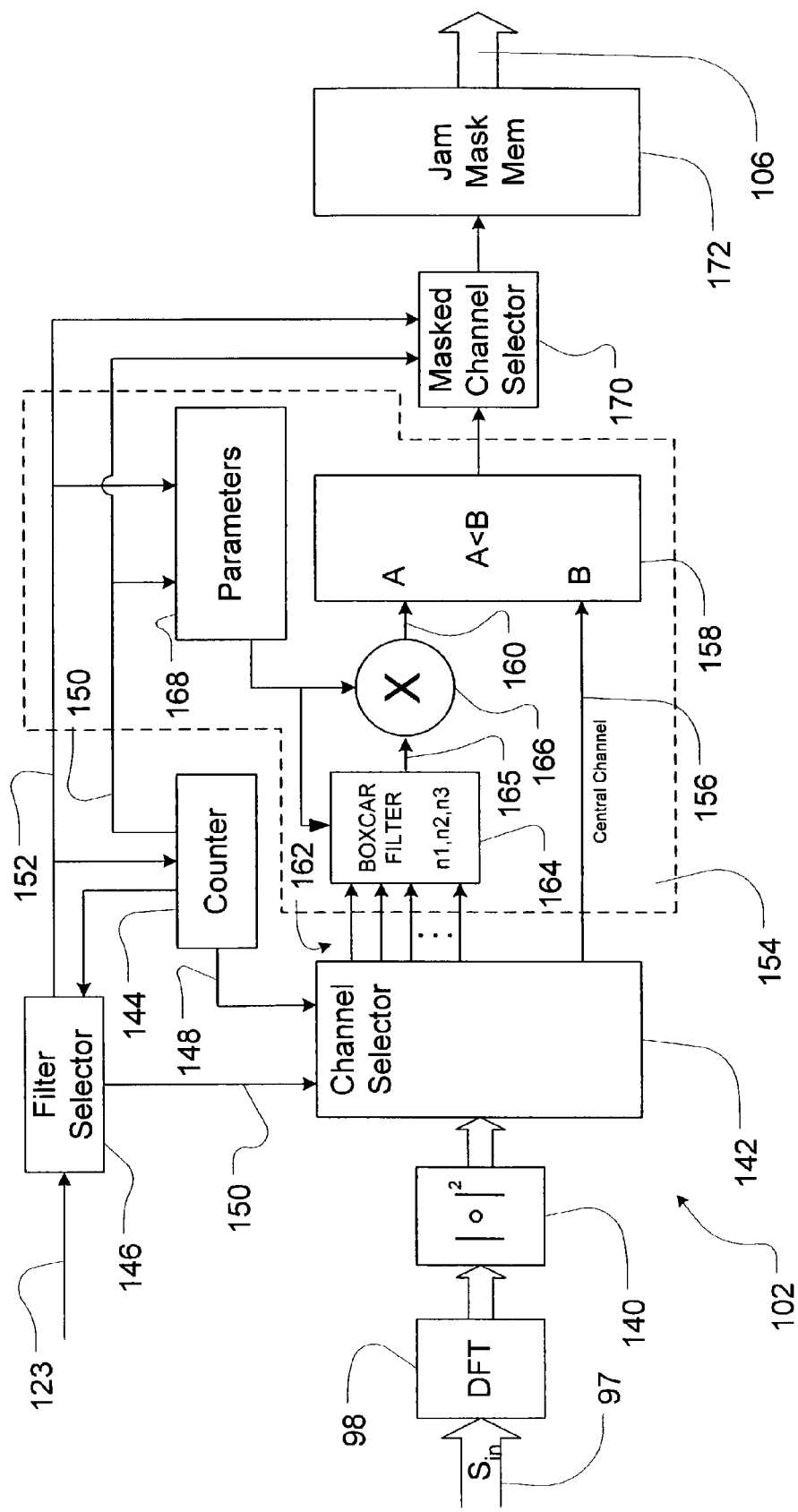
FIG. 9 is a block diagram of a narrowband jamming signal detector of the modem shown in FIG. 8.

FIG. 9 is a block diagram of the narrowband jammer signal detector 102 shown in FIG. 8. The DFT unit 98 that receives a signal 97 outputs DFT data to a magnitude squared function 140 that computes the squared magnitude of each complex DFT output and then sends the data to a channel selector 142. The channel selector 142 stores the received DFT data and uses commands from a counter 144 and a filter selector 146 that are coupled to the channel selector 142 via respective connections 148 and 150, to select DFT values that are associated with a specific OFDM channel and adjacent channels. As described above, jammed channels are identified by applying a jammed channel detection filter 154 to the DFT data. In the preferred embodiment of the invention, the sliding window filter 154 is applied to each channel sequentially. Each selected channel is centered in a boxcar filter 164, that computes a reference value 165. The counter 144 is adapted to provide a number that permits the channel selector 142 to select a specific channel that is to be centered in the boxcar filter 164. A value of the selected central channel (central channel 156) is sent to a comparator 158 that compares the value of the central channel 156 to a threshold value 160, that is an average value of channels that are adjacent 162 to the central channel 156, times a threshold factor. The reference number 165 is calculated, as described above, using the boxcar filter 164 that receives the values of the set of adjacent channels 162 received from the channel selector 142. These values are summed and then a multiplier 166 multiplies the sum by a parameter 168 of the filter.

If the value of the central channel 156 is greater than the threshold value 160, the comparator 158 sends a signal to a jam mask memory 172 to mark the selected channel 156 as a jammed channel.

The comparator 158 compares the reference value 160 and the value of the selected channel 156 and outputs either "True", if the value of the selected channel is greater than the reference number (indicating that the selected channel is jammed channel) or "False" if the value of the selected channel is less than the reference number (indicating that the selected channel is not a jammed channel).

In order to simplify the embodiment of the present invention, instead of using frequency response of the DFT to identify adjacent channels affected by a jammer channel as described above, a masked channel selector 170 can be used. The masked channel selector 170 is coupled to the counter 144, the filter selector 146 and the comparator 158. The masked channel selector 170 is connected to a jam mask memory 172 and outputs information identifying a jammed channel and adjacent channels likely to be affected by the jammed channel. The masked channel selector 170 performs the following steps.

| | | |
|---|---|---|
| 01. | IF Jam Detect = True | |
| 02 | Write Jam mask memory (Counter) | |
| 03. | FOR A = 1 to Neighbor Parameter | |
| 04. | B = Counter | |
| 05. | Compute B − A | |
| 06. | IF B ≧ 0 | |
| 07. | Write Jam mask memory (B) | |
| 08. | C = Counter | |
| 09. | Compute C + A | |
| 10. | IF C ≦ 83 | |
| 11. | Write Jam Mask memory (C) | |
| 12. | NEXT (A) | |
| 13. | END IF | |

If the jam detect signal is "True" (step 01), the masked channel selector 170 writes in the jam mask memory 162 a current value of the counter 144, which is a sequential number representation of the jammed channel. Then a loop (steps 03-12) that repeats steps 04-11 is executed a number of times determined by a variable "Neighbor Parameter". The Neighbor Parameter is a real number and its value depends on the characteristics of each window filter. In an embodiment of the invention, the Neighbor Parameter is set to: 1 for a 2-3-2 boxcar filter with the lowest threshold value, 2 for a 2-3-2 boxcar filter with a higher threshold value and 3 for a 2-5-2 boxcar filter with a still higher threshold value.

It shall be noted that in one embodiment of the invention, a window filter that uses different parameters is applied sequentially three times to the same DFT data stored in the channel selector 142. As described above the characteristics of the filter are determined by a threshold parameter and a size, variables $n_1$, $n_2$ and $n_3$, for each rectangular window.

In an embodiment, the narrowband jamming signal detector 102 uses the following boxcar windows: 2-3-2 and 2-5-2. Identification of the jammed channels using different parameters for window filters permits detection of different respective jammed channels.

The embodiment(s) of the invention described above is(are) intended to be exemplary only. The scope of the invention is therefore intended to be limited solely by the scope of the appended claims.

We claim:

1. An apparatus for detecting a narrowband jamming signal in a block oriented digital transmission system, comprising:
   a filtering unit adapted to receive data from a channel selector for identifying a channel that is jammed;
   a masked channel selector adapted to receive an indication of a jammed channel from the filtering unit and to identify a predetermined number of channels adjacent to the jammed channel that are not identified as jammed;
   a jam mask memory adapted to store information that identifies the jammed channel and the predetermined number of adjacent channels not identified as jammed;
   wherein the filtering unit comprises,
     a filter adapted to receive data from the channel selector and adapted to provide an average power of selected channels different from a channel centered in the filter, and
     a comparator adapted to receive, from the channel selector, a power of the channel centered in the in the filter, adapted to receive a threshold value that is larger than the average power of the selected channels, and adapted to provide a signal to the masked channel selector for identifying the channel centered in the filter as a jammed channel if the power of the channel centered in the filter is greater than the threshold value.

2. An apparatus as claimed in claim 1 wherein the block oriented digital transmission system is an orthogonal frequency division multiplexing (OFDM) system.

3. An apparatus as claimed in claim 1 wherein the block oriented digital transmission system is a discrete multi-tone (DMT) data system.

4. An apparatus as claimed in claim 1 further comprising means for providing the information that identifies the jammed channel and adjacent channels stored in the jam mask memory.

5. An apparatus as claimed in claim 1 further comprising a processing module adapted to receive the stored information that identifies the jammed channel and the predetermined number of adjacent channels not identified as jammed, and to process a signal transmitted over the digital transmission system based on the jammed channel and the predetermined number of adjacent channels not identified as jammed.

6. An apparatus as claimed in claim 5 wherein the processing module comprises a forward error correction (FEC) decoder adapted to process the signal based on the jammed channel and the predetermined number of adjacent channels not identified as jammed as an indication of channels on which the signal is likely to have errors.

7. An apparatus as claimed in claim 5 wherein the processing module comprises a symbol synchronizer adapted to process the signal deleting the jammed channel and the predetermined number of adjacent channels not identified as jammed from the processing.

8. An apparatus as claimed in claim 1 wherein the selected channels from which the average power is provided include channels having higher and lower frequencies than the channel centered in the filter.

9. An apparatus as claimed in claim 8 wherein the selected channels include channels having frequencies higher and lower than the predetermined number of adjacent channels not identified as jammed.

10. An apparatus for detecting a narrowband jamming signal in a block oriented digital transmission system, comprising:
    a filtering unit adapted to receive data from a channel selector for identifying a channel that is jammed by a jamming signal having a signal power that exceeds a predetermined threshold with respect to an average power of selected channels:
    a masked channel selector adapted to receive an indication of the jammed channel from the filtering unit and to identify a predetermined number of channels adjacent to the jammed channel that are not identified as jammed by the jamming signal:
    a jam mask memory adapted to store information that identifies the jammed channel and the adjacent channels;
    a boxcar filter having inputs connectable to the channel selector and an output for providing an average power of the selected channels;
    a multiplier connected to the boxcar filter, for computing a reference value by multiplying the average power of the selected channels by a threshold factor; and
    a comparator having a first input for receiving, from the channel selector, a first value of a channel centered in the boxcar filter, a second input for receiving, from the multiplier, the reference value and an output that feeds a signal to the masked channel selector for identifying the channel centered in the boxcar filter as a jammed channel if the first value is greater than the reference value.

11. An apparatus claimed in claim 10 further comprising a counter connectable to the channel selector, the filtering unit and the masked channel selector for defining the channel centered in the boxcar filter and the adjacent channels.

12. An apparatus claimed in claim 11 further comprising a filter selector connectable to the counter, the channel selector, the filtering unit and the masked channel selector for specifying parameters of the filtering unit.

13. An apparatus as claimed in claim 10 further comprising a parameter-storing unit connected to the multiplier and boxcar filter for providing predetermined parameters to the multiplier and the boxcar filter.

14. An apparatus as claimed in claim 13 wherein the filtering unit is adapted to sequentially apply a first set of boxcar filter parameters, a second set of boxcar filter parameters, and a third set of boxcar filter parameters using the same set of data from the channel selector.

15. An apparatus as claimed in claim 13 wherein the filtering unit is adapted to sequentially supply a first threshold factor, a second threshold factor, and a third threshold factor to the multiplier.

16. An apparatus as claimed in claim 10 wherein the boxcar filter comprises, a first rectangular window that is $n_1$ samples wide, a second rectangular window that is $n_2$ samples wide and a third rectangular window that is $n_3$ samples wide.

17. An apparatus as claimed in claim 10 wherein the comparator is adapted to output a first signal to the masked channel selector if a channel is identified as jammed and a second signal to the masked channel selector if the channel is not identified as jammed.

18. An apparatus as claimed in claim 17 wherein the masked channel selector is adapted to write into the jam mask memory a value that identifies the jammed channel and values that identify the predetermined number of channels adjacent to the jammed channel on receipt from the comparator of the first signal.

19. A method for detecting narrowband jamming signals in a block oriented digital transmission system, comprising:
selecting a plurality of channels using a channel selector
filtering a set of data based on a first selected channel received from the channel selector for identifying a jammed channel;
computing an average power of selected channels different from the first selected channel
computing a threshold value that is larger than the computed average power;
comparing a power of the first selected channel with the threshold value and identifying the first selected channel as the jammed channel if the power of the first selected channel is greater than the threshold value;
identifying a predefined number of channels adjacent to the jammed channel that are not identified as jammed; and
storing data for identifying the jammed channel and the predetermined number of adjacent channels not identified as jammed in a jam mask memory.

20. A method as claimed in claim 19 further comprising producing a series (u(n)) by pre-summing a physical (PHY) layer symbol having a cyclic prefix.

21. A method as claimed in claim 20 further comprising producing a series (U(ω)) by performing an N-point discrete Fourier transform (DFT) of u(n).

22. A method as claimed in claim 20 wherein pre-summing comprises applying a weighting function to the cyclic prefix and PHY symbol.

23. A method as claimed in claim 20 wherein pre-summing comprises applying a raised cosine function to the cyclic prefix and PHY symbol.

24. A method as claimed in claim 19 further comprising transmitting the data for identifying the jammed channel and the predetermined number of adjacent channels not identified as jammed over the digital transmission system.

25. A method as claimed in claim 19 wherein the selected channels from which the average power is calculated include channels having higher and lower frequencies than the first selected channel.

26. A method as claimed in claim 25 wherein the selected channels include channels having higher and lower frequencies than the predetermined number of adjacent channels not identified as jammed.

27. A method for detecting narrowband jamming signals in a block oriented digital transmission system, comprising:
filtering a set of data from a selected channel received from a channel selector for identifying a jammed channel that transmits a signal having a signal power that exceeds a predetermined threshold with respect to an average power of selected channels using at least one window filter, wherein the filtering comprises computing a reference value from the set of data using a boxcar filter, computing a threshold value by multiplying the reference value by a threshold factor, and comparing a power of the selected channel with the threshold value and outputting a value having a first value if the power of the selected channel is greater than the threshold value and outputting a signal having a second value if the power of the selected channel is less than the threshold value;
identifying a predefined number of channels adjacent to the jammed channel that are not identified as jammed; and
storing data for identifying the jammed channel and the adjacent channels in a jam mask memory.

28. A method as claimed in claim 27 further comprising incrementing a counter for selecting a channel to be centered in the boxcar filter.

29. A method as claimed in claim 27 further comprising providing parameters for determining a size of window used by the boxcar filter.

30. A method as claimed in claim 27 further comprising providing the threshold factor from a predetermined list of threshold factors.

31. A method as claimed in claim 30 wherein filtering further comprises using a rectangular window filter, and a predetermined threshold factor, consisting of a first rectangular window, a third rectangular window that are separated by a second rectangular window.

32. A method as claimed in claim 30 wherein filtering further comprises sequentially applying a first set of boxcar filter parameters, a second set of boxcar filter parameters, and a third set of boxcar filter parameters to the same set of data from the channel selector.

33. A method as claimed in claim 32 wherein storing the data for identifying the jammed channel and the adjacent channels comprises storing a first number of adjacent channels when applying the first set of boxcar filter parameters, a second number of adjacent channels when applying the second set of boxcar filter parameters and a third number of adjacent channels when applying the third set of boxcar filter parameters.

* * * * *